United States Patent
Howe (10) Patent No.: US 10,332,177 B2
(45) Date of Patent: Jun. 25, 2019

(54) METHOD AND SYSTEM FOR DETECTING PRICING DRIVEN BY BROWSER SETTINGS

(71) Applicant: MASTERCARD INTERNATIONAL INCORPORATED, Purchase, NY (US)

(72) Inventor: Justin X. Howe, Oakdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 806 days.

(21) Appl. No.: 14/699,327

(22) Filed: Apr. 29, 2015

(65) Prior Publication Data

US 2016/0321724 A1 Nov. 3, 2016

(51) Int. Cl.
*G06Q 30/00* (2012.01)
*G06Q 30/06* (2012.01)
*G06F 17/27* (2006.01)

(52) U.S. Cl.
CPC ..... *G06Q 30/0623* (2013.01); *G06F 17/2705* (2013.01)

(58) Field of Classification Search
None
See application file for complete search history.

(56) References Cited

U.S. PATENT DOCUMENTS

| 8,050,976 B2 | 11/2011 | Staib et al. |
| 8,205,265 B2 | 6/2012 | Carter |
| 8,566,726 B2 | 10/2013 | Dixon et al. |
| 2002/0104090 A1* | 8/2002 | Stettner ............... H04N 5/4401 725/60 |
| 2002/0128920 A1* | 9/2002 | Chopra ................. G06Q 30/06 705/26.8 |
| 2003/0043070 A1* | 3/2003 | Soliman ................ H04L 67/18 342/357.48 |
| 2006/0161484 A1* | 7/2006 | Pandhe ................. G06Q 30/06 705/26.81 |
| 2007/0073641 A1* | 3/2007 | Perry .................... G06F 16/335 |

(Continued)

OTHER PUBLICATIONS

Smith, Michael D. "The impact of shopbots on electronic markets." Journal of the Academy of Marketing Science 30.4 (2002): 446. (Year: 2002).*

*Primary Examiner* — Christopher B Seibert
(74) *Attorney, Agent, or Firm* — Ohlandt, Greeley, Ruggiero & Perle, L.L.P.

(57) ABSTRACT

A method and a system are provided for detecting pricing driven by browser settings. A method and a system are also provided for identifying merchants that are using browser-driven or cookie-driven price setting mechanisms, and for helping shoppers obtain the lowest available price for a product or service. A computer system-implemented method includes utilizing a webcrawler program or other searching program to access one or more merchant websites and recover pricing and/or other product or service information, identifying one or more browser settings that minimize price of a product or a service, accessing the one or more merchant websites with a computer device having the one or more browser settings that minimize price of the product or service, and purchasing the product or service at the minimized price. The computer system-implemented method can also utilize a central hub that connects multiple computer devices together.

4 Claims, 4 Drawing Sheets

(56) References Cited

U.S. PATENT DOCUMENTS

| | | | |
|---|---|---|---|
| 2007/0150369 A1* | 6/2007 | Zivin | G06Q 30/02 |
| | | | 705/26.64 |
| 2008/0172307 A1* | 7/2008 | Hurowitz | G06Q 30/0633 |
| | | | 705/26.3 |
| 2009/0138439 A1* | 5/2009 | Yeung | G06F 16/9537 |
| 2012/0042001 A1 | 2/2012 | Carter | |
| 2012/0046998 A1 | 2/2012 | Staib et al. | |
| 2013/0325554 A1 | 12/2013 | Ouimet | |
| 2014/0223573 A1 | 8/2014 | Reedy et al. | |

* cited by examiner

METHOD AND SYSTEM FOR DETECTING PRICING DRIVEN BY BROWSER SETTINGS

BACKGROUND OF THE DISCLOSURE

1. Field of the Disclosure

The present disclosure relates to a method and a system for detecting pricing driven by browser settings. In particular, a method and a system are provided to identify merchants that are using browser-driven or cookie-driven price setting mechanisms, and to help shoppers obtain the lowest available price for a product or service, given the merchant's price setting mechanism.

2. Description of the Related Art

For years, the Internet, with its ease of quick comparison shopping, has granted people a certain power over retailers. At the click of a button, shoppers can search for, and in many instances find, a better deal elsewhere, no travel required.

However, the idea of an unbiased, impersonal Internet is fast giving way to an online world that, in reality, is increasingly tailored and targeted. Websites are adopting techniques to glean information about visitors to their sites, in real time, and then deliver different versions of the Web to different people. Prices change, products get swapped out, wording is modified, and there is little way for the typical website user to spot it when it happens.

It is difficult for online shoppers to know why, or even if, they are being offered different deals from other merchants. Many sites switch prices at lightning speed in response to competitors' offerings and other factors, a practice known as "dynamic pricing". Other sites test different prices but do so without regard to the buyer's characteristics.

In today's marketplace, several retailers consistently adjust prices and display different product offers based on a range of characteristics that can be discovered about the user or customer. Such characteristics include, for example, browsing history of customers and geolocation of customers. Based on these characteristics, the retailers vary offers and products that they display to a visitor to its site.

What is worrisome to customers is that retailers are charging different prices based on an individual's characteristics or buying history. There is strong evidence that this occurs on a regular basis. And while it can be noted that such practices can be imposed offline in the brick-and-mortar environment as well, the Internet has driven such capabilities to a new level.

Thus, there is a need for a method and a system to identify merchant websites that vary prices based on an individual's characteristics or buying history (e.g., browser settings and cookies). Also, there is a need to help customers get the best price for products and services at websites of merchants that engage in such practices.

SUMMARY OF THE DISCLOSURE

The present disclosure provides a method and a system for detecting pricing driven by browser settings. In particular, a method and a system are provided to identify merchants that are using browser-driven or cookie-driven price setting mechanisms, and to help shoppers obtain the lowest available price, given the merchant's price setting mechanism.

The present disclosure also provides a computer system-implemented method that includes utilizing, with a first set of browser settings, a webcrawler program or other searching program to access one or more merchant websites and recover pricing and/or other product or service information; accessing pricing and/or other product or service information from the one or more merchant websites; recording pricing and/or other product or service information recovered by the webcrawler program or other searching program; and utilizing, with a second set of browser settings, the webcrawler program or other searching program and the recorded pricing and/or other product or service information to access the one or more merchant websites and recover pricing and/or other product or service information. The method further includes comparing the pricing and/or other product or service information recovered with the webcrawler program or other searching program utilized with the first set of browser settings, with the pricing and/or other product or service information recovered with the webcrawler program or other searching program utilized with the second set of browser settings; and determining if the pricing and/or other product or service information recovered with the webcrawler program or other searching program utilized with the first set of browser settings is the same or different as the pricing and/or other product or service information recovered with the webcrawler program or other searching program utilized with the second set of browser settings.

The method yet further includes determining a minimized price for the product or service, and purchasing the product or service at the minimized price.

The present disclosure further provides a computer system-implemented method that includes utilizing a first computer device having a first set of browser settings and a webcrawler program or other searching program to access one or more merchant websites and recover pricing and/or other product or service information; accessing pricing and/or other product or service information from the one or more merchant websites; recording pricing and/or other product or service information recovered by the webcrawler program or other searching program; connecting the first computer device having the first set of browser settings and the webcrawler program or other searching program and the recorded pricing and/or other product or service information to a central hub, wherein the central hub connects multiple computer devices together; and utilizing the multiple computer devices having browser settings different from the first set of browser settings, and having the webcrawler program or other searching program and the recorded pricing and/or other product or service information, to access the one or more merchant web sites and recover pricing and/or other product or service information. The method further includes comparing the pricing and/or other product or service information recovered with the webcrawler program or other searching program utilized with the first computer device having the first set of browser settings, with the pricing and/or other product or service information recovered with the webcrawler program or other searching program utilized with the one or more other computer devices having browser settings different from the first set of browser settings; and determining, by the central hub, if the pricing and/or other product or service information recovered with the webcrawler program or other searching program utilized with the first computer device having the first set of browser settings is the same or different as the pricing and/or other product or service information recovered with the webcrawler program or other searching program utilized with the one or more other computer devices having browser settings different from the first set of browser settings.

The method yet further includes determining a minimized price for the product or service, and purchasing the product or service at the minimized price.

The present disclosure still further provides a computer system-implemented method that includes utilizing a webcrawler program or other searching program to access one or more merchant websites and recover pricing and/or other product or service information; identifying one or more browser settings that minimize price of a product or a service; accessing the one or more merchant websites with a computer device having the one or more browser settings that minimize price of the product or service; and purchasing the product or service at the minimized price.

The present disclosure yet further provides a computer system-implemented method that includes accessing a central hub that connects multiple computer devices together; utilizing the multiple computer devices having a webcrawler program or other searching program to access one or more merchant websites and recover pricing and/or other product or service information; identifying one or more browser settings that minimize price of a product or a service; accessing one or more merchant websites with at least one of the multiple computer devices having browser settings that minimize price of the product or service; and purchasing the product or service at the minimized price. The central hub connects together multiple computer devices having the webcrawler program or other searching program rather than consolidating the input of users. For example, if one user in San Francisco looks at a product and one user in New York looks at the same product, the central hub preferably combines the prices shown to each of the users in addition to the webcrawler data.

The present disclosure yet still further provides a computer-implemented system that includes a webcrawler program or other searching program utilized with a first set of browser settings to access one or more merchant web sites and recover pricing and/or other product or service information; pricing and/or other product or service information recorded by the webcrawler program or other searching program at the one or more merchant web sites, wherein the webcrawler program or other searching program utilized with a second set of browser settings and the recorded pricing and/or other product or service information to access the one or more merchant websites and recover pricing and/or other product or service information; and a database containing the pricing and/or other product or service information recovered with the webcrawler program or other searching program utilized with the first set of browser settings, and the pricing and/or other product or service information recovered with the webcrawler program or other searching program utilized with the second set of browser settings.

The present disclosure also provides a computer-implemented system that includes a first computer device having a first set of browser settings and a webcrawler program or other searching program to access one or more merchant websites and recover pricing and/or other product or service information; pricing and/or other product or service information recorded by the webcrawler program or other searching program; a central hub connecting the first computer device and one or more other computer devices together; the one or more other computer devices having browser settings different from the first set of browser settings, and having the webcrawler program or other searching program and the recorded pricing and/or other product or service information, to access the one or more merchant web sites and recover pricing and/or other product or service information; and a database containing pricing and/or other product or service information recovered with the webcrawler program or other searching program utilized with the first computer device having the first set of browser settings, and the pricing and/or other product or service information recovered with the webcrawler program or other searching program utilized with the one or more other computer devices having browser settings different from the first set of browser settings.

The present disclosure further provides a computer-implemented system that includes a webcrawler program or other searching program for accessing one or more merchant websites and recovering pricing and/or other product or service information, and a computer device having one or more browser settings that minimize price of a product or a service.

The present disclosure yet further provides computer-implemented system that includes a central hub that connects multiple computer devices together; the multiple computer devices having a webcrawler program or other searching program for accessing one or more merchant websites and recovering pricing and/or other product or service information; and at least one of the multiple computer devices having one or more browser settings that minimize price of a product or a service.

DESCRIPTION OF THE EMBODIMENTS

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements. Like numbers refer to like elements throughout.

As used herein, entities can include one or more persons, organizations, businesses, institutions and/or other entities, such as financial institutions, services providers, and the like that implement one or more portions of one or more of the embodiments described and/or contemplated herein. In particular, entities can include a person, business, school, club, fraternity or sorority, an organization having members in a particular trade or profession, sales representative for a particular product, charity, not-for-profit organization, labor union, local government, government agency, or political party. It should be understood that the methods and systems of this disclosure can be practiced by a single entity or by multiple entities. Although different entities can carry out different steps or portions of the methods and systems of this disclosure, all of the steps and portions included in the methods and systems of this disclosure can be carried out by a single entity.

As used herein, the one or more databases configured to store information can be the same or different databases.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage device, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

As used herein, the webcrawler programs or other searching programs are commercially available programs. Illustrative of such programs include, for example, WebCrawler™, Googlebot™, Bingbot™, 80Legs™, BlackLocus™, and the like. Open-source programs can also be useful in this disclosure.

The webcrawler program or other searching program accesses one or more merchant websites and recovers pricing and/or other product or service information. The webcrawler program or other searching program navigates and parses one or more pages of the merchant website to locate pricing and/or other product or service information. The parsing includes identifying and recording one or more of product description, UPC (Universal Product Code), price, ingredients, and size.

As used herein, the browser settings (e.g., the first set of browser settings and the second set of browser settings) include one or more of general settings, security settings, privacy settings, content settings, connection settings, program settings and/or advanced settings. Different browser settings are used to identify merchants that are using browser-driven price setting mechanisms, and to help shoppers obtain the lowest available price for a product or service.

The general browser settings include, for example, one or more of change home page, delete browsing history, change search settings, change tab settings, and customize appearance of browser. The security settings include, for example, one or more of set default and custom security levels for Internet, intranet, and specific websites. The privacy settings include, for example, one or more of change cookie and pop-up blocker settings. The content settings include, for example, one or more of turn on content advisor or change its settings, view and manage security certificates, or change feed settings. The connection settings include, for example, one or more of set up an Internet connection, add or change dial-up and virtual private network (VPN) settings, and change local area network (LAN) settings. The program settings include, for example, one or more of change default web browser, e-mail program, HTML editor, or Internet telephone, and manage web browser add-ons. The advanced settings include, for example, one or more of change advanced settings for accessibility, browsing, HTTP (hypertext transfer protocol) handling, international domain names, multimedia, printing, search, and security.

Different browser settings can include different computing devices, for example, Apple® computer, Dell® computer, and the like. Different browser settings can also include different operating systems such as Android® mobile operating system, Dell Chrome operating system, Dell IE operating system, and the like.

As used herein, the central hub connects multiple computer devices together. The central hub performs many functions including, for example, processing information and routing the processed information to one or more entities. The central hub is also used to store the information.

The central hub can determine if the pricing and/or other product or service information recovered with the webcrawler program or other searching program utilized with a first computer device having a first set of browser settings is the same or different as the pricing and/or other product or service information recovered with the webcrawler program or other searching program utilized with one or more other computer devices having browser settings different from the first set of browser settings.

The central hub can notify a first computer device used by a shopper that the pricing and/or other product or service information recovered with the webcrawler program or other searching program utilized with the first computer device having the first set of browser settings is different from the pricing and/or other product or service information recovered with the webcrawler program or other searching program utilized with the one or more other computer devices having browser settings different from the first set of browser settings.

The central hub processes and/or stores the pricing and/or other product or service information recovered with the webcrawler program or other searching program utilized with the first computer device having the first set of browser settings and the pricing and/or other product or service information recovered with the webcrawler program or other searching program utilized with the one or more other computer devices having browser settings different from the first set of browser settings. The central hub can also route the processed information to one or more entities.

The central hub can maintain connections to various cloud storage options so that information is seamlessly pushed to cloud storage while also being retrieved and used. In addition, the hub provides quality control (QC) tools. The central hub provides a quality controlled environment that tracks movement of information and makes such information available to one or more entities. The central hub validates delivery and access of information by recipients and removes/replaces information that may have been delivered or generated in error.

In an embodiment, the central hub can algorithmically analyze the pricing and/or other product or service information recovered with the webcrawler program or other searching program utilized with the first computer device having the first set of browser settings and the pricing and/or other product or service information recovered with the webcrawler program or other searching program utilized with the one or more other computer devices having browser settings different from the first set of browser settings to generate at least a minimized price for the product or service Algorithms can be employed to determine formulaic descriptions of the integration of the pricing and/or other product or service information using any of a variety of known mathematical techniques. These formulas, in turn, can be used to derive or generate one or more analyses and updates for analyzing, creating, comparing and identifying activities using any of a variety of available trend analysis algorithms. For example, these formulas can be used in the reporting and data analysis, including the storing, reviewing, and/or analyzing of information, for the various purposes described herein.

The systems and the methods of this disclosure utilize standard statistical techniques (e.g., time series methods, serial correlations, clustering, regression, correlation, segmentation, raking, and the like) to identify merchants that are using browser-driven or cookie-driven price setting mechanisms, and to help shoppers obtain the lowest available price for a product or service, given the merchant's price setting mechanism. The identification can be refined by looking at factors such as time, geography, frequency, and the like.

Logic can be created for analyzing the pricing and/or other product or service information recovered with the webcrawler program or other searching program to identify merchants that are using browser-driven or cookie-driven price setting mechanisms, and to help shoppers obtain the lowest available price for a product or service, given the merchant's price setting mechanism. Attributes (e.g., confidence, time, frequency, and the like) can then be assigned to the information to make it useful to potential end users.

Figure 1:
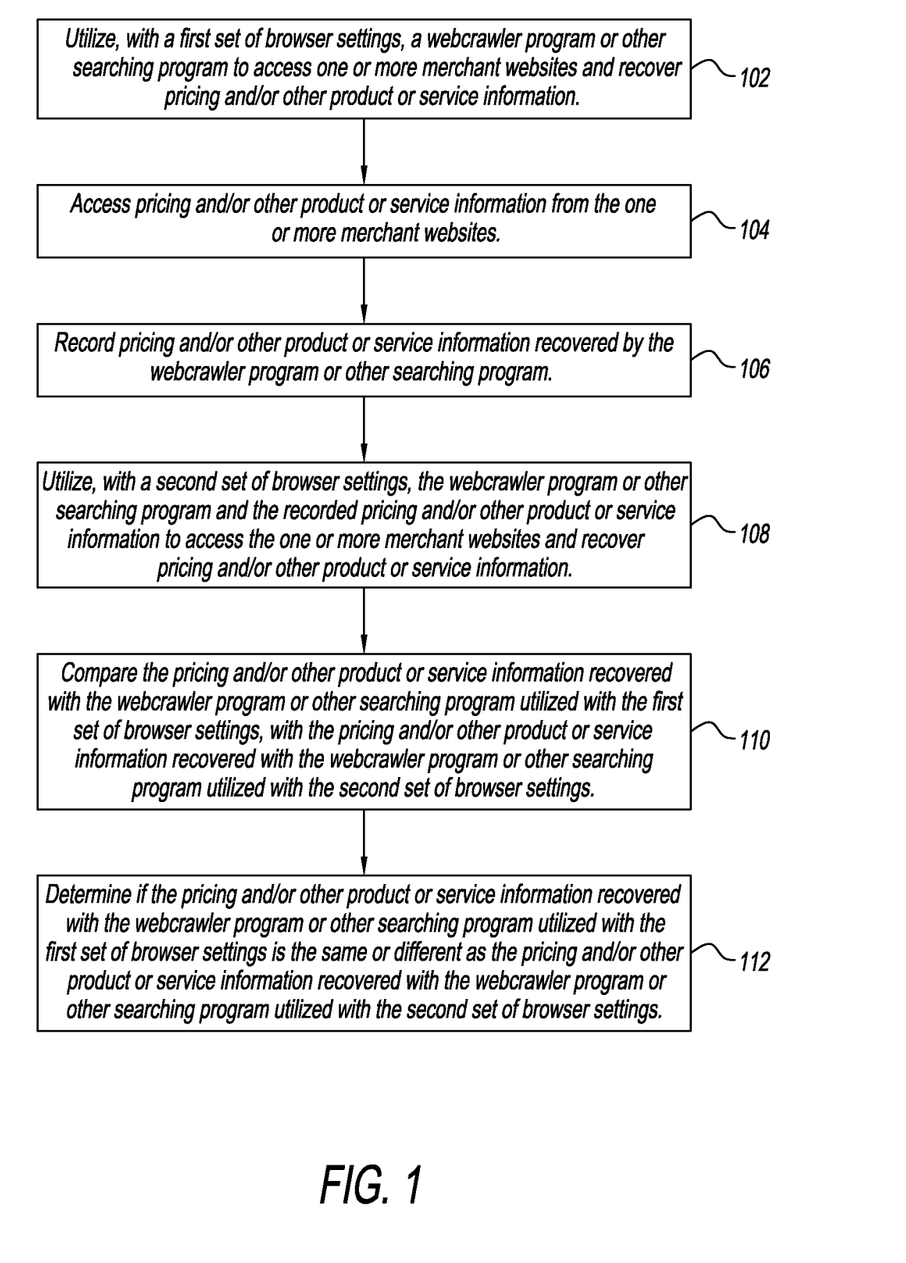
FIG. 1 is a block diagram illustrating a method for identifying merchants that are using browser-driven price setting mechanisms in accordance with exemplary embodiments of the present disclosure.

In an embodiment, this disclosure provides a method and a system for detecting pricing driven by browser settings. Referring to FIG. 1, the method of this disclosure utilizes at 102, with a first set of browser settings, a webcrawler program or other searching program to access one or more merchant websites and recover pricing and/or other product or service information. The pricing and/or other product or service information includes one or more of a description of the product or service, price of the product or service, name of merchant offering the product or service, identification of merchant website, and date and time of offering the product or service. At 104, pricing and/or other product or service information is accessed from the one or more merchant websites. The pricing and/or other product or service information recovered by the webcrawler program or other searching program is recorded at 106. The webcrawler program or other searching program navigates and parses one or more pages of the one or more merchant websites to locate pricing and/or other product or service information. The parsing and identified information includes identifying and recording one or more of product description, UPC (Universal Product Code), price, ingredients, and size.

The method utilizes at 108, with a second set of browser settings, the webcrawler program or other searching program and the recorded pricing and/or other product or service information to access the one or more merchant web sites and recover pricing and/or other product or service information. At 110, the pricing and/or other product or service information recovered with the webcrawler program or other searching program utilized with the first set of browser settings is compared with the pricing and/or other product or service information recovered with the webcrawler program or other searching program utilized with the second set of browser settings. At 112, it is determined if the pricing and/or other product or service information recovered with the webcrawler program or other searching program utilized with the first set of browser settings is the same or different as the pricing and/or other product or service information recovered with the webcrawler program or other searching program utilized with the second set of browser settings.

In accordance with the method, an entity (e.g., shopper) can be notified that the pricing and/or other product or service information recovered with the webcrawler program or other searching program utilized with the first set of browser settings is different from the pricing and/or other product or service information recovered with the webcrawler program or other searching program utilized with the second set of browser settings.

Further, in accordance with the method, a minimized price for the product or service is determined, and the product or service is purchased by a shopper at the minimized price.

Figure 2:
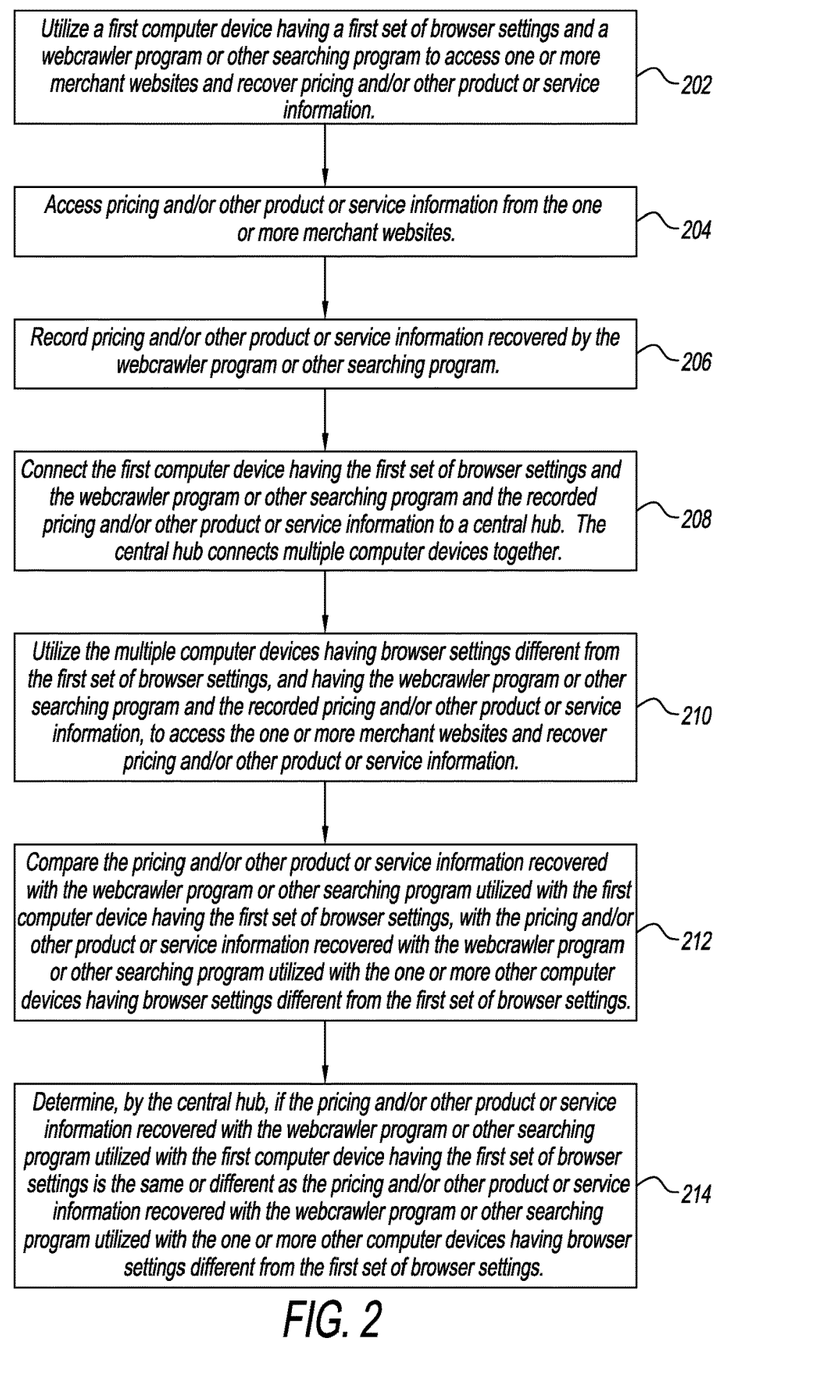
FIG. 2 is a block diagram illustrating another method for identifying merchants that are using browser-driven price setting mechanisms in accordance with exemplary embodiments of the present disclosure.

In another embodiment, this disclosure provides a method and a system for detecting pricing driven by browser settings using a central hub that connects multiple computer devices. Referring to FIG. 2, the method of this disclosure utilizes at 202 a first computer device having a first set of browser settings and a webcrawler program or other searching program to access one or more merchant websites and recover pricing and/or other product or service information. The pricing and/or other product or service information includes one or more of a description of the product or service, price of the product or service, name of merchant offering the product or service, identification of merchant web site, and date and time of offering the product or service. At 204, pricing and/or other product or service information is accessed from the one or more merchant websites. The pricing and/or other product or service information recovered by the webcrawler program or other searching program is recorded at 206. The webcrawler program or other searching program navigates and parses one or more pages of the one or more merchant websites to locate pricing and/or other product or service information. The parsing includes identifying and recording one or more of product description, UPC (Universal Product Code), price, ingredients, and size.

At 208, the first computer device having the first set of browser settings and the webcrawler program or other searching program and the recorded pricing and/or other product or service information is connected to a central hub. The central hub connects multiple computer devices together. The method utilizes at 210 the multiple computer devices having browser settings different from the first set of browser settings, and having the webcrawler program or other searching program and the recorded pricing and/or other product or service information, to access the one or more merchant web sites and recover pricing and/or other product or service information.

At 212, the pricing and/or other product or service information recovered with the webcrawler program or other searching program utilized with the first computer device having the first set of browser settings is compared with the pricing and/or other product or service information recovered with the webcrawler program or other searching program utilized with the one or more other computer devices having browser settings different from the first set of browser settings. At 214, the central hub determines if the pricing and/or other product or service information recovered with the webcrawler program or other searching program utilized with the first computer device having the first set of browser settings is the same or different as the pricing and/or other product or service information recovered with the webcrawler program or other searching program utilized with the one or more other computer devices having browser settings different from the first set of browser settings.

In accordance with the method, an entity (e.g., shopper) can be notified by the central hub that the pricing and/or other product or service information recovered with the webcrawler program or other searching program utilized with the first computer device having the first set of browser settings is different from the pricing and/or other product or service information recovered with the webcrawler program or other searching program utilized with the one or more other computer devices having browser settings different from the first set of browser settings.

Further, in accordance with the method, a minimized price for the product or service is determined, and the product or service is purchased by a shopper at the minimized price.

Figure 3:
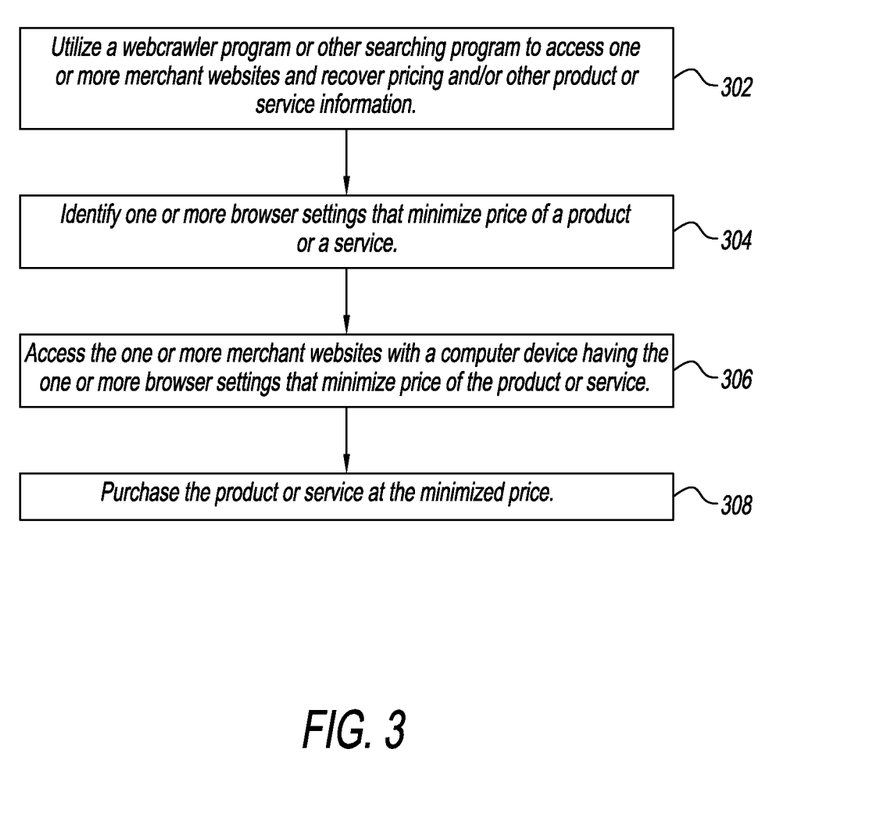
FIG. 3 is a block diagram illustrating a method for helping shoppers obtain the lowest available price, given the merchant's browser-driven price setting mechanism, in accordance with exemplary embodiments of the present disclosure.

In an embodiment, this disclosure provides a method and a system for helping shoppers obtain the lowest available price for a product or a service at a merchant that has been identified as using browser-driven price setting mechanisms. Referring to FIG. 3, the method of an embodiment of this disclosure utilizes at 302 a webcrawler program or other searching program to access one or more merchant websites and recover pricing and/or other product or service information. The pricing and/or other product or service information includes one or more of a description of the product or service, price of the product or service, name of merchant offering the product or service, identification of merchant web site, and date and time of offering the product or service. The webcrawler program or other searching program navigates and parses one or more pages of the one or more merchant websites to locate pricing and/or other product or service information. The parsing includes identifying and recording one or more of product description, UPC (Universal Product Code), price, ingredients, and size.

At 304, one or more browser settings are identified that minimize price of a product or a service. At 306, the one or more merchant websites are accessed with a computer device having the one or more browser settings that minimize price of the product or service. At 308, the product or service is purchased by a shopper at the minimized price.

Figure 4:
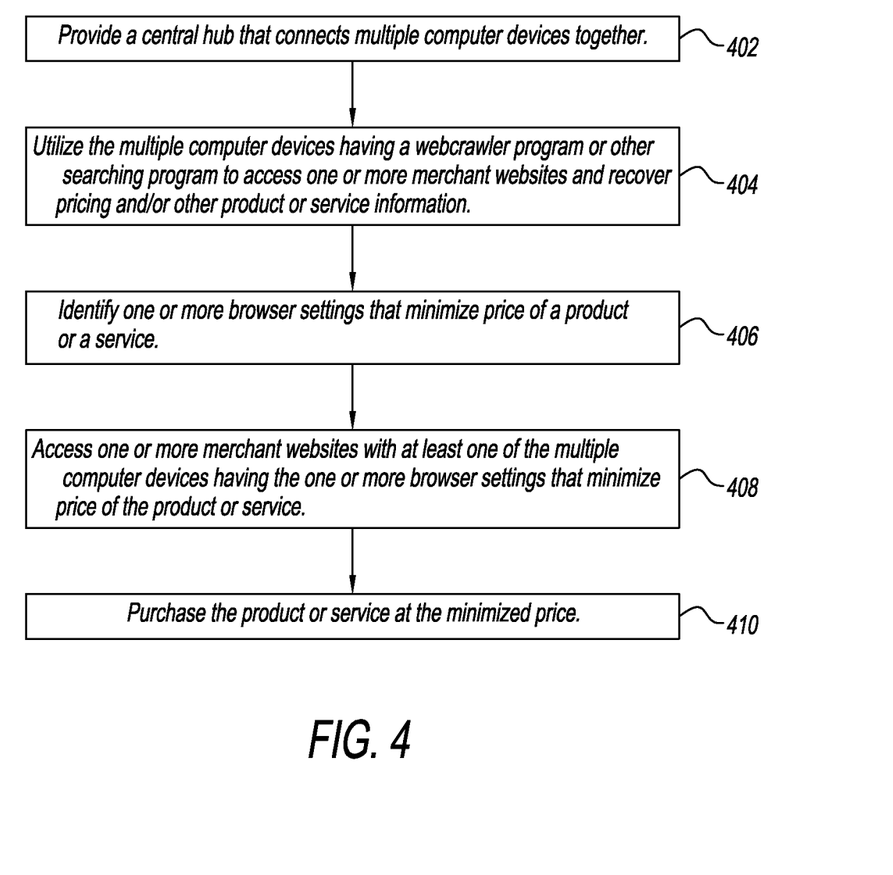
FIG. 4 is a block diagram illustrating another method for helping shoppers obtain the lowest available price, given the merchant's browser-driven price setting mechanism, in accordance with exemplary embodiments of the present disclosure.

In another embodiment, this disclosure provides a method and a system for helping shoppers obtain the lowest available price for a product or a service at a merchant that has been identified as using browser-driven price setting mechanisms. Referring to FIG. 4, the method of this disclosure provides at 402 a central hub that connects multiple computer devices together. The method utilizes at 404 the multiple computer devices having a webcrawler program or other searching program to access one or more merchant websites and recover pricing and/or other product or service information. The pricing and/or other product or service information includes one or more of a description of the product or service, price of the product or service, name of merchant offering the product or service, identification of merchant website, and date and time of offering the product or service. The webcrawler program or other searching program navigates and parses one or more pages of the one or more merchant websites to locate pricing and/or other product or service information. The parsing includes identifying and recording one or more of product description, UPC (Universal Product Code), price, ingredients, and size.

At 406, one or more browser settings are identified that minimize price of a product or a service. At 408, one or more merchant websites are accessed with at least one of the multiple computer devices having the one or more browser settings that minimize price of the product or service. At 410, the product or service is purchased at the minimized price.

It will be understood that the present disclosure may be embodied in a computer readable non-transitory storage medium storing instructions of a computer program which when executed by a computer system results in performance of steps of the method described herein. Such storage media can include any of those mentioned in the description above.

Where methods described above indicate certain events occurring in certain orders, the ordering of certain events may be modified. Moreover, while a process depicted as a flowchart, block diagram, and the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on."

The techniques described herein are exemplary, and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A computer system-implemented method comprising:
   configuring a program with a first set of browser settings;
   accessing a merchant website using said program with said first set of browser settings and obtaining first pricing information for a product or service;
   recording said first pricing information;
   configuring said program with a second set of browser settings;
   accessing said merchant website using said program with said second set of browser settings and obtaining second pricing information for said product or service;
   recording said second pricing information;
   comparing said second pricing information to said first pricing information, thus yielding a comparison;
   determining from said comparison, which of said first pricing information or said second pricing information indicates a lower price for said product or service, and thus, which of said first set of browser settings or said second set of browser settings yielded said lower price, and thus a set of browser settings that yielded said lower price;
   accessing said merchant website using said program with said set of browser settings that yielded said lower price; and
   facilitating a purchase of said product or service from said merchant website by a shopper using a program with said set of browser settings that yielded said lower price.

2. The computer system-implemented method of claim 1, wherein said first pricing information includes one or more items of information selected from the group consisting of a description of said product or service, price of said product or service, a name of a merchant offering said product or service, an identification of aid merchant website, and a date and a time of offering said product or service.

3. The computer system-implemented method of claim 1, wherein said first set of browser settings and said second set of browser settings are different, and wherein each of said first and second sets of browser settings include one or more settings selected from the group consisting of general settings, security settings, privacy settings, content settings, connection settings, program settings, and advanced settings.

4. The computer system-implemented method of claim 1, wherein said program performs operations of navigating and parsing one or more pages of said merchant website to locate said first pricing information and other product or service information, and wherein said parsing includes identifying and recording one or more items of information selected from the group consisting of a product description, a UPC (Universal Product Code), a price, ingredients, and a size.

* * * * *